US010533429B2

(12) United States Patent
Bloxham et al.

(10) Patent No.: US 10,533,429 B2
(45) Date of Patent: Jan. 14, 2020

(54) TIP STRUCTURE FOR A TURBINE BLADE WITH PRESSURE SIDE AND SUCTION SIDE RAILS

(71) Applicant: Rolls-Royce Corporation, Indianapolis, IN (US)

(72) Inventors: Matthew J. Bloxham, Indianapolis, IN (US); Jon V. Ebacher, Avon, IN (US); Guillermo Paniagua Perez, West Lafayette, IN (US); Valeria Andreoli, West Lafayette, IN (US); Cis Guy M. De Maesschalck, Kortrijk (BE); James Braun, West Lafayette, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 232 days.

(21) Appl. No.: 15/818,244

(22) Filed: Nov. 20, 2017

(65) Prior Publication Data

US 2018/0245469 A1 Aug. 30, 2018

Related U.S. Application Data

(60) Provisional application No. 62/463,928, filed on Feb. 27, 2017.

(51) Int. Cl.
*F01D 5/20* (2006.01)

(52) U.S. Cl.
CPC ....................... *F01D 5/20* (2013.01)

(58) Field of Classification Search
CPC . F01D 5/20; F01D 5/284; F01D 5/282; F01D 11/20
See application file for complete search history.

(56) References Cited

U.S. PATENT DOCUMENTS 3,339,933 A 9/1967 Foster
3,616,125 A 10/1971 Bowling
(Continued)

FOREIGN PATENT DOCUMENTS

CA 2955738 A1 * 2/2016 ............... F01D 5/20
EP 2 316 988 A1 5/2011
(Continued)

OTHER PUBLICATIONS

European Search Report and Written Opinion for European Patent No. 18153946.1-1006, dated Apr. 11, 2018, 7 pages.
(Continued)

*Primary Examiner* — Woody A Lee, Jr.
(74) *Attorney, Agent, or Firm* — Brinks Gilson & Lione (57) ABSTRACT

A tip structure for a turbine blade comprises a tip surface of an airfoil that extends from a leading edge to a trailing edge and from a pressure side to a suction side of the airfoil. A suction side rail protrudes from the tip surface and comprises: a trailing portion extending flush with the suction side of the airfoil from an origination location at or near the trailing edge to an intermediate location on the suction side; and a leading portion extending from the intermediate location across the tip surface so as to create a suction side shelf region between the leading portion of the suction side rail and the suction side of the airfoil. A pressure side rail protrudes from the tip surface and comprises: a trailing segment extending flush with the pressure side of the airfoil from an origination location at or near the trailing edge to a middle location on the pressure side; and a leading segment extending from the middle location across a camber line on the tip surface so as to create a pressure side shelf region between the leading segment of the pressure side rail and the pressure side of the airfoil.

21 Claims, 11 Drawing Sheets

(56) References Cited

U.S. PATENT DOCUMENTS

| | | | |
|---|---|---|---|
| 3,628,885 A | 12/1971 | Sidenstick et al. | |
| 3,854,842 A | 12/1974 | Caudill | |
| 4,390,320 A * | 6/1983 | Eiswerth | F01D 5/005 29/889.1 |
| 4,424,001 A * | 1/1984 | North | F01D 5/20 416/92 |
| 4,893,987 A | 1/1990 | Lee et al. | |
| 5,564,902 A * | 10/1996 | Tomita | F01D 5/20 415/115 |
| 5,733,102 A | 3/1998 | Lee et al. | |
| 6,059,530 A | 5/2000 | Lee | |
| 6,179,556 B1 | 1/2001 | Bunker | |
| 6,190,129 B1 * | 2/2001 | Mayer | F01D 5/187 416/235 |
| 6,554,575 B2 * | 4/2003 | Leeke | F01D 5/186 416/224 |
| 6,672,829 B1 * | 1/2004 | Cherry | F01D 5/141 415/115 |
| 6,991,430 B2 | 1/2006 | Stec et al. | |
| 7,281,894 B2 | 10/2007 | Lee et al. | |
| 7,473,073 B1 | 1/2009 | Liang | |
| 7,740,445 B1 | 6/2010 | Liang | |
| 8,011,889 B1 | 9/2011 | Liang | |
| 8,113,779 B1 * | 2/2012 | Liang | F01D 5/20 416/92 |
| 8,182,221 B1 * | 5/2012 | Liang | F01D 5/087 415/115 |
| 9,085,988 B2 | 7/2015 | Kwon et al. | |
| 9,284,845 B2 | 3/2016 | Lewis et al. | |
| 2007/0258815 A1 | 11/2007 | Liang | |
| 2013/0266454 A1 | 10/2013 | Mongillo, Jr. et al. | |
| 2013/0302166 A1 * | 11/2013 | Lee | B23P 6/002 416/95 |
| 2014/0112753 A1 | 4/2014 | Zhang et al. | |
| 2015/0292335 A1 | 10/2015 | Dawson et al. | |

FOREIGN PATENT DOCUMENTS

| | | | |
|---|---|---|---|
| WO | WO 2014/099814 A1 | 6/2014 | |
| WO | WO-2016007116 A1 * | 1/2016 | F01D 5/20 |

OTHER PUBLICATIONS

Ameri, A. A. et al., "Effect of Squealer Tip on Rotor Heat Transfer and Efficiency," *ASME Journal of Turbomachinery*, 120, 4 (1998) pp. 753-759.

* cited by examiner

TIP STRUCTURE FOR A TURBINE BLADE WITH PRESSURE SIDE AND SUCTION SIDE RAILS

RELATED APPLICATION

The present patent document claims the benefit of priority under 35 U.S.C § 119(e) to U.S. Provisional Patent Application No. 62/463,928, on Feb. 27, 2017, which is hereby incorporated by reference in its entirety.

TECHNICAL FIELD

The present disclosure is directed to an airfoil for a gas turbine engine and more particularly to a tip structure configured for controlled over-tip flow and effective tip cooling.

BACKGROUND

Gas turbine engines include a compressor, combustor and turbine in flow series along a common shaft. Compressed air from the compressor is mixed with fuel in the combustor to generate hot combustion gases that rotate the turbine blades and drive the compressor. Flow leakage over the tips of the airfoils may result in reduced aerodynamic performance and high heat transfer. Consequently, there is significant interest in developing improved tip geometries that minimize over-tip loss while maintaining or improving tip heat transfer.

BRIEF SUMMARY

A tip structure for a turbine blade that allows improved control of over-tip flow is described herein. The tip structure includes a tip surface of an airfoil that extends from a leading edge to a trailing edge and from a pressure side to a suction side of the airfoil. A suction side rail protrudes from the tip surface and comprises: a trailing portion extending flush with the suction side of the airfoil from an origination location at or near the trailing edge to an intermediate location on the suction side; and a leading portion extending from the intermediate location across the tip surface so as to create a suction side shelf region between the leading portion of the suction side rail and the suction side of the airfoil. A pressure side rail protrudes from the tip surface and comprises: a trailing segment extending flush with the pressure side of the airfoil from an origination location at or near the trailing edge to a middle location on the pressure side; and a leading segment extending from the middle location across a camber line on the tip surface so as to create a pressure side shelf region between the leading segment of the pressure side rail and the pressure side of the airfoil.

DETAILED DESCRIPTION

Described in this disclosure is a tip structure for a turbine blade that includes pressure and suction side rails configured to maximize aerodynamic efficiency and/or minimize heat transfer on the tip surface.

Figure 1A:
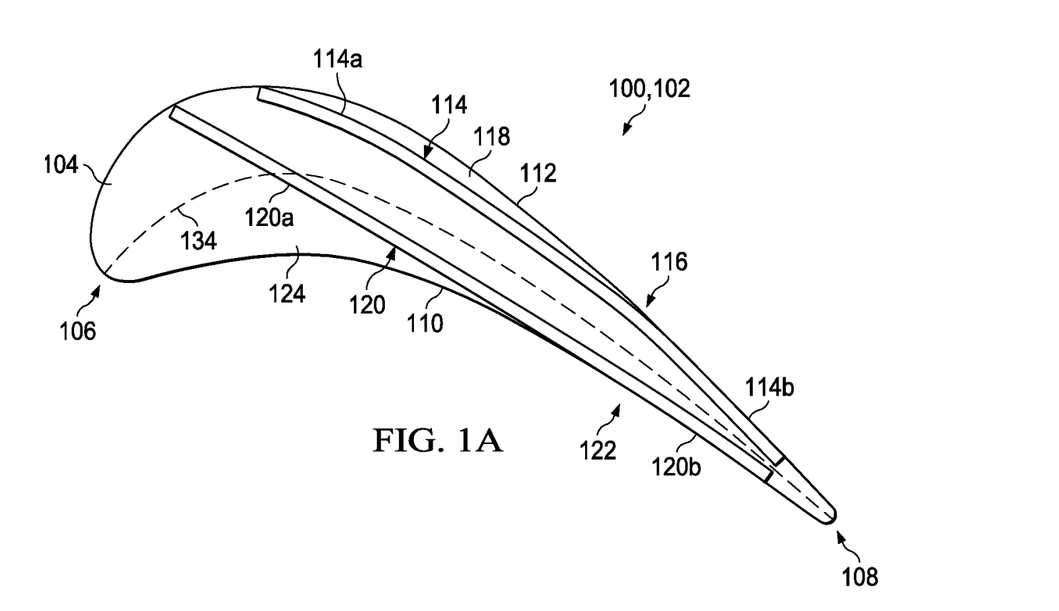
FIG. 1A is a top view of an exemplary tip structure for a turbine blade, according to one embodiment.
Figure 1B:
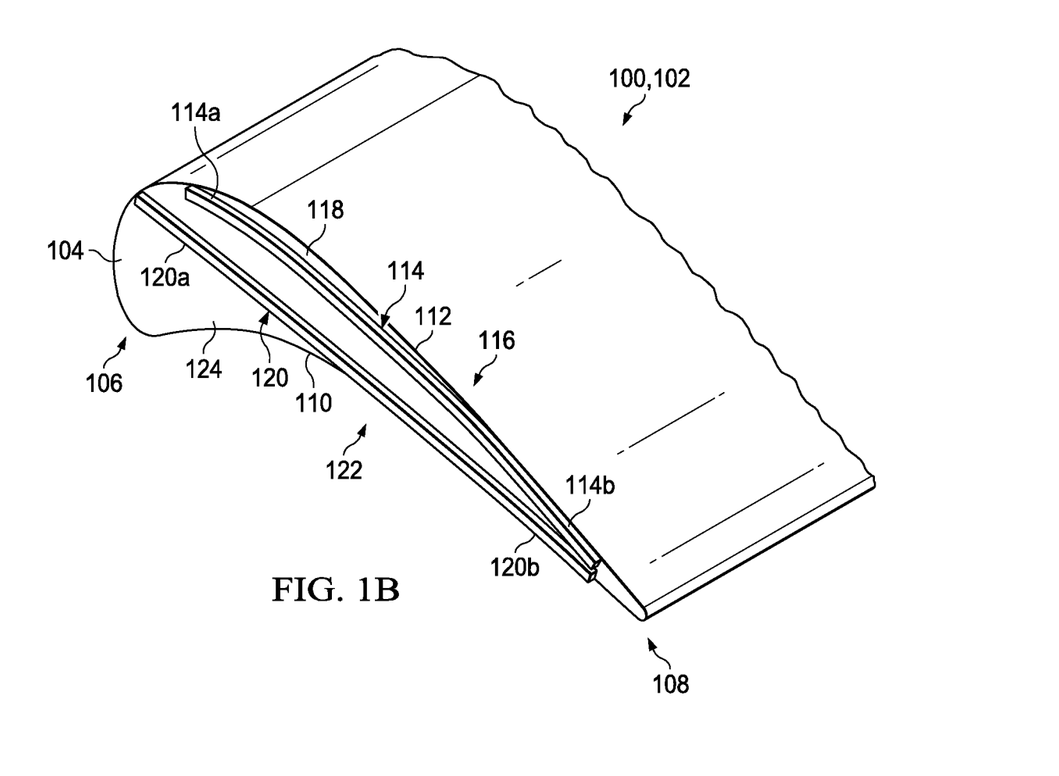
FIG. 1B is a perspective view of the exemplary tip structure of FIG. 1A.

Referring first to FIGS. 1A and 1B, the tip structure 102 includes a tip surface 104 that extends from a leading edge 106 to a trailing edge 108 and from a pressure side 110 to a suction side 112 of the turbine blade or airfoil 100. A suction side rail 114 protrudes from the tip surface 104 and extends from the suction side 112 of the airfoil 100 at or near the trailing edge 108 toward the leading edge 106 in a generally chordal direction. The suction side rail 114 includes a leading portion 114a nearer to the leading edge 106 and a trailing portion 114b closer to the trailing edge. A pressure side rail 120 protrudes from the tip surface 104 and extends from the pressure side 110 of the airfoil 100 at or near the trailing edge 108 toward the leading edge 106 in a generally chordal direction. The pressure side rail 120 includes a leading segment 120a nearer to the leading edge 106 and a trailing segment 120b closer to the trailing edge 108.

The trailing portion 114b of the suction side rail 114 extends along the tip surface 104 flush with the suction side 112 of the airfoil from an origination location at or near the trailing edge 108 to an intermediate location 116 on the suction side 112 of the airfoil 100. The intermediate location 116 may be understood to be a low pressure region at or near the throat of the airfoil 100. At the intermediate location 116, the leading portion 114a of the suction side rail 114 crosses over the tip surface 104 and defines a suction side shelf 118 between the suction side rail 114 (more specifically, between the leading portion 114a thereof) and the suction side 112 of the airfoil 100. In other words, in contrast to the trailing portion 114b, which is flush with the suction side 112 of the airfoil 100, the leading portion 114a of the suction side rail 114 is recessed from the suction side 112 of the airfoil 100 so as to form the suction side shelf 118. The suction side shelf 118 may allow for the development of a stream-wise vortex (which may be referred to as a shelf vortex) that may act as an over-tip flow restrictor. The shelf vortex may produce a vena-contracta effect which aerodynamically reduces the effective tip clearance in what is typically the leakiest region; consequently, the suction side shelf 118 may allow over-tip leakage to be reduced and/or redirection of the over-tip flow so as to align it with the suction side flow field.

Figure 2:
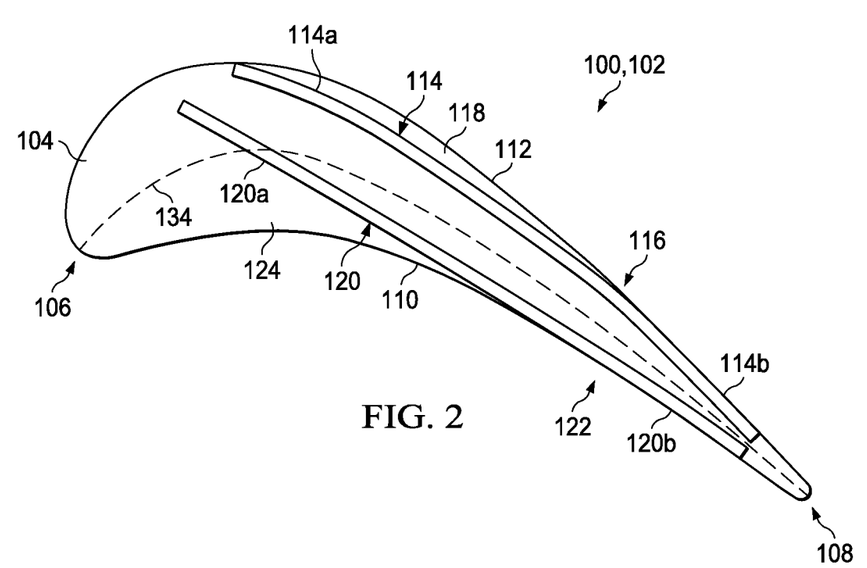
FIG. 2 is a top view of an exemplary tip structure for a turbine blade, according to another embodiment.

The trailing segment 120b of the pressure side rail 120 extends flush with the pressure side 110 of the airfoil 100 from an origination location at or near the trailing edge 108 to a middle location 122 on the pressure side 110 of the airfoil 100. The middle location 122 may be understood to be at or near a midpoint of the pressure side 110 of the airfoil 100 with respect to the leading and trailing edges 106,108. The leading segment 120a extends from the middle location 122 toward the suction side 112 of the airfoil 100, crossing over a camber line 134 on the tip surface 104 and creating a pressure side shelf 124 between the pressure side rail 120 and the pressure side 110 of the airfoil 100. More specifically, the pressure side shelf 124 is formed between the leading segment 120a of the pressure side rail 120 and the pressure side 110 of the airfoil 100. While the camber line 134 is not shown in all of the drawings, it is understood to be inherent to the tip surface 104 of the airfoil 100. The leading segment 120a of the pressure side rail 120 may terminate on the suction side 112 of the airfoil 100, as shown in FIGS. 1A and 1B, or short of the suction side 112 of the airfoil 100, as shown in FIG. 2. More specifically, the leading segment 120a may terminate at a forward location on the suction side 112 (e.g., on the forward suction side 112f) of the airfoil 100, such as where the over-tip leakage switches from incoming to outgoing.

Figure 3A:
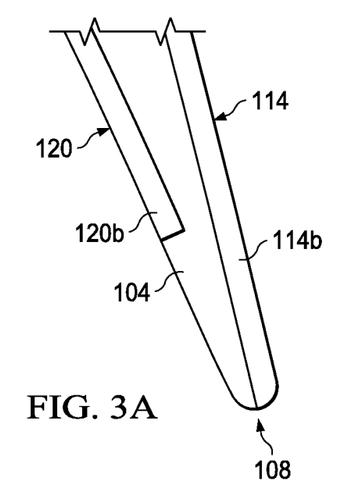
FIGS. 3A-3D show top views of the trailing edge of exemplary tip structures according to various embodiments.
Figure 3B:
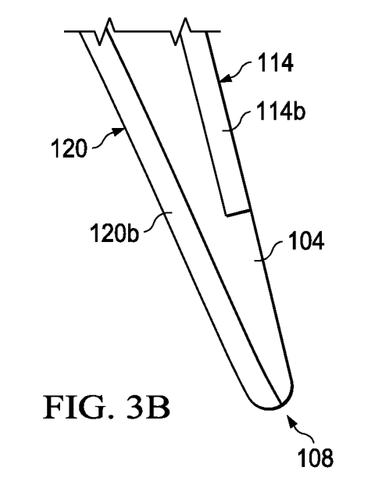
Figure 3C:
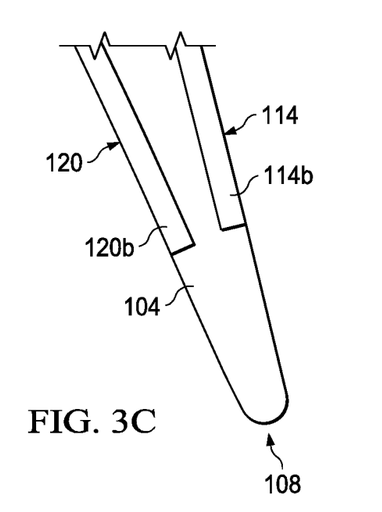
Figure 3D:
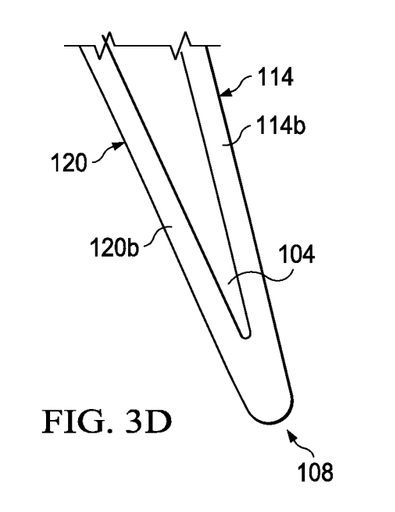

The pressure side rail 120 may be spaced apart from the suction side rail 114 on the tip surface 104 at or near the trailing edge 108 to allow fluid flow to exit the tip structure 102. More specifically, the trailing portion 114b of the suction side rail 114 and the trailing segment 120b of the pressure side rail 120 may be spaced apart at the trailing edge 108. To achieve this spacing, one or both of the pressure and suction side rails 120,114 may have an origination location short of the trailing edge 108, as shown by the embodiments of FIGS. 3A-3C. Alternatively, the pressure side rail 120 may be joined to the suction side rail 114 at or near the trailing edge 108, as illustrated according to different embodiments in FIG. 3D and FIG. 5C. Referring first to FIG. 5D, the trailing segment 120b of the pressure side rail 120 may be joined to the trailing portion 114b of the suction side rail 114 by a closing rail 140 on the tip surface 104. The closing rail 140 may be recessed from the trailing edge 108 so as to define a trailing edge shelf region between the closing rail 140 and the trailing edge 108. Alternatively, as shown in FIG. 3D, the pressure and suction side rails 120,114 may both originate at the trailing edge 108 and thus may be joined at the trailing edge 108 without the closing rail.

Figure 4:
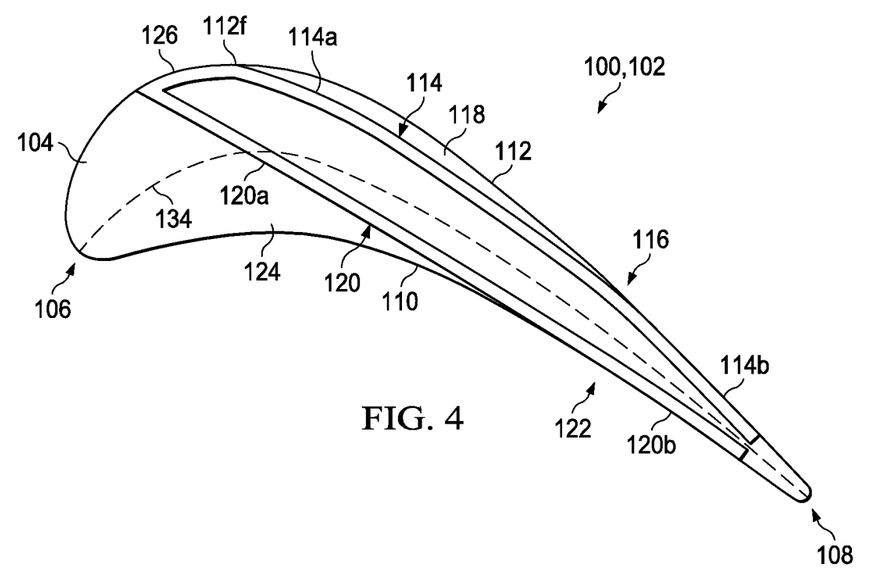
FIG. 4 is a top view of an exemplary tip structure for a turbine blade, according to another embodiment.
Figure 5A:
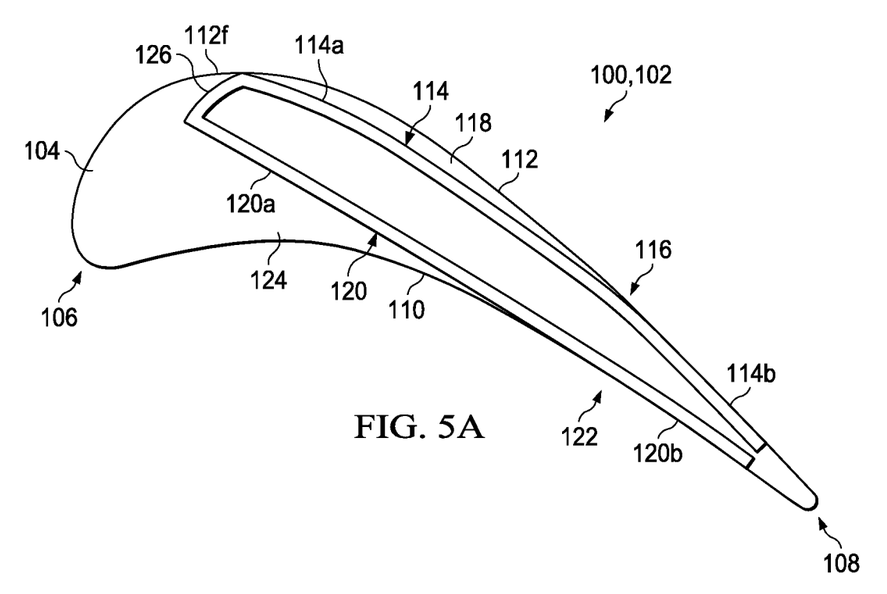
FIGS. 5A-5C are a top views of exemplary tip structures for a turbine blade, according to several embodiments.
Figure 5B:
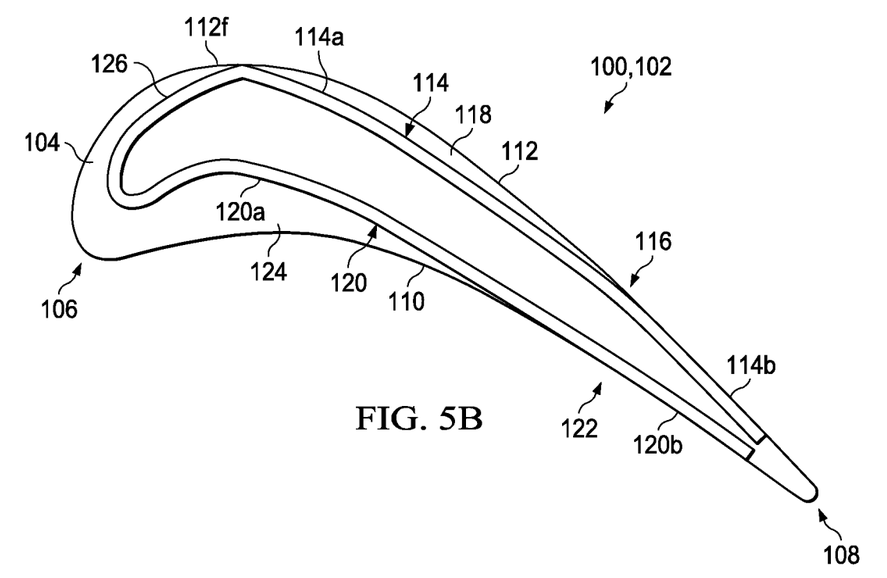
Figure 5C:
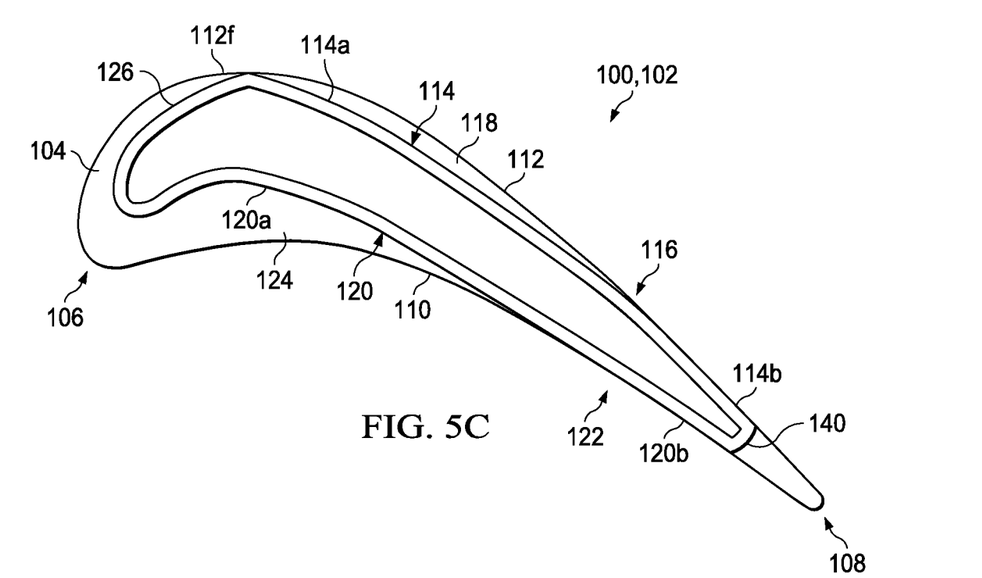

Returning to FIGS. 1A, 1B and 2, it can be seen that the leading portion 114a of the suction side rail 114 and the leading segment 120a of the pressure side rail 120 may be spaced apart on the tip surface 104. Leaving a gap between the side rails 114,120 may allow for a reduction in both weight and heat flux without a significant change in leakage. Alternatively, as shown in FIGS. 4 and 5A-5C, the leading portion 114a of the suction side rail 114 and the leading segment 120a of the pressure side rail 120 may be joined by a joining rail 126 on the tip surface 104. The joining rail 126 may provide better mechanical integrity in the event of contact between the tip structure 102 and the overlying case. The joining rail 126 may extend along the tip surface 104 flush with the forward suction side 112f of the airfoil 100, as shown in FIG. 4. Alternatively, all or part of the joining rail 126 may be recessed from the forward suction side 112f on the tip surface 104, as shown for example in FIG. 5A, thereby forming a shelf region between the joining rail 126 and the forward suction side 112f. The joining rail 126 may extend in the direction of the leading edge 106, as shown in FIG. 5B, such that the leading segment 120a of the pressure side rail 120 curves toward the leading edge before or after crossing the camber line 134 in order to join up with the joining rail 126. In some embodiments, as discussed previously and as shown in FIG. 5C, the trailing segment 120b of the pressure side rail 120 may be joined to the trailing portion 114b of the suction side rail 114 by a closing rail 140 on the tip surface 104.

When a rail or rail portion (e.g., pressure side rail, suction side rail, leading segment of the pressure side rail, etc.) on the tip surface is described as originating or terminating "near the [position]" or "short of the [position]," where [position] may be substituted with leading edge, trailing edge, intermediate location or another location, it may be understood that the rail or rail portion originates or terminates a distance d or less from the [position], where the distance d is equal to 20% of a total length of the rail.

Figure 6:
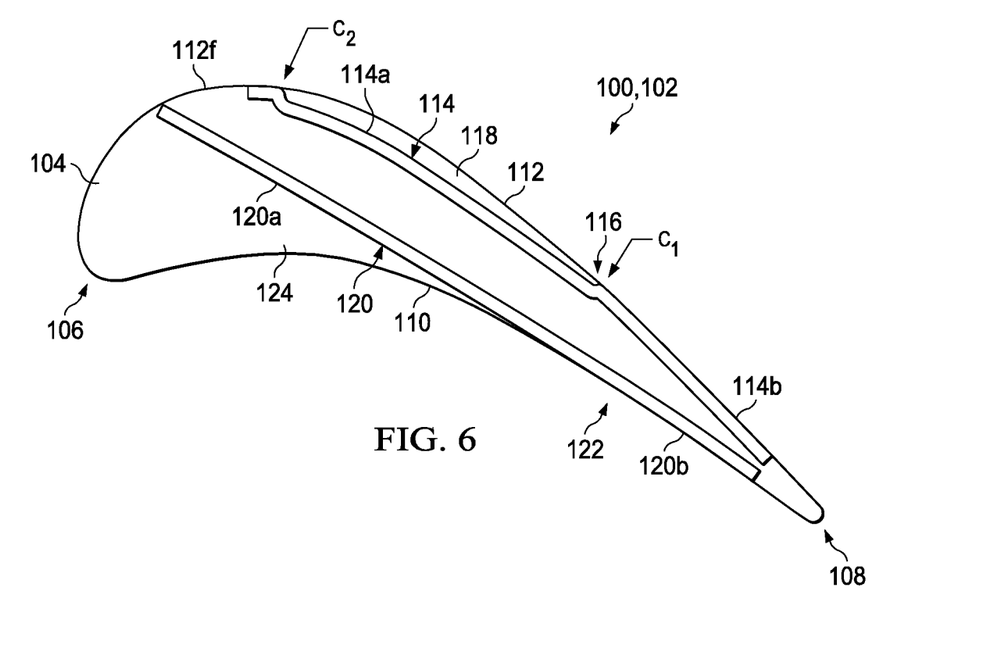
FIG. 6 is a top view of an exemplary tip structure for a turbine blade, according to another embodiment.

As shown in FIGS. 1-2 and 4-5C, the leading portion 114a of the suction side rail 114 may be substantially straight or gently curved. Alternatively, as shown for example in FIG. 6, the leading portion 114a of the suction side rail 114 may include at least one abrupt curve or jog. An "abrupt" curve or jog may be understood to refer to a change in direction of at least about 20 degrees of one portion of a given side rail with respect to another portion of the given side rail, where the curve or jog has a radius of curvature that is much smaller than (e.g., about 10% of or less) the length of the side rail. For example, at or near the throat location 116, the leading portion 114a of the suction side rail 114 may exhibit an abrupt curve or jog $C_1$, as illustrated in FIG. 6. In another example in the same figure, an abrupt jog or curve $C_2$ can be seen in the leading portion 114a of the suction side rail 114 on the forward suction side 112f.

Figure 7:
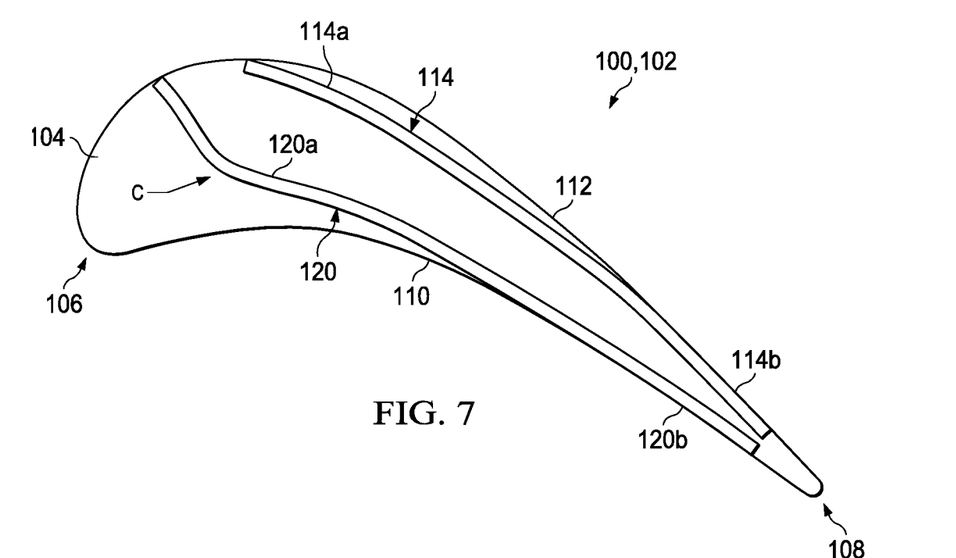
FIG. 7 is a top view of an exemplary tip structure for a turbine blade, according to another embodiment.

Similarly, the leading segment 120a of the pressure side rail 120 may be substantially straight or gently curved, as shown in FIGS. 1-2 and 4-6. Alternatively, as shown for example in FIG. 7, the leading segment 120a of the pressure side rail 120 may include at least one abrupt curve or jog. As above, an "abrupt" curve or jog may be understood to refer to a change in direction of at least about 20 degrees of one portion of the side rail with respect to another portion of the side rail, where the curve or jog has a radius of curvature that is much smaller than (e.g., about 10% of or less) the length of the side rail. For example, FIG. 7 shows an abrupt curve or jog C in the leading segment 120a of the pressure side rail 120 near to the leading edge 106.

Figure 8:
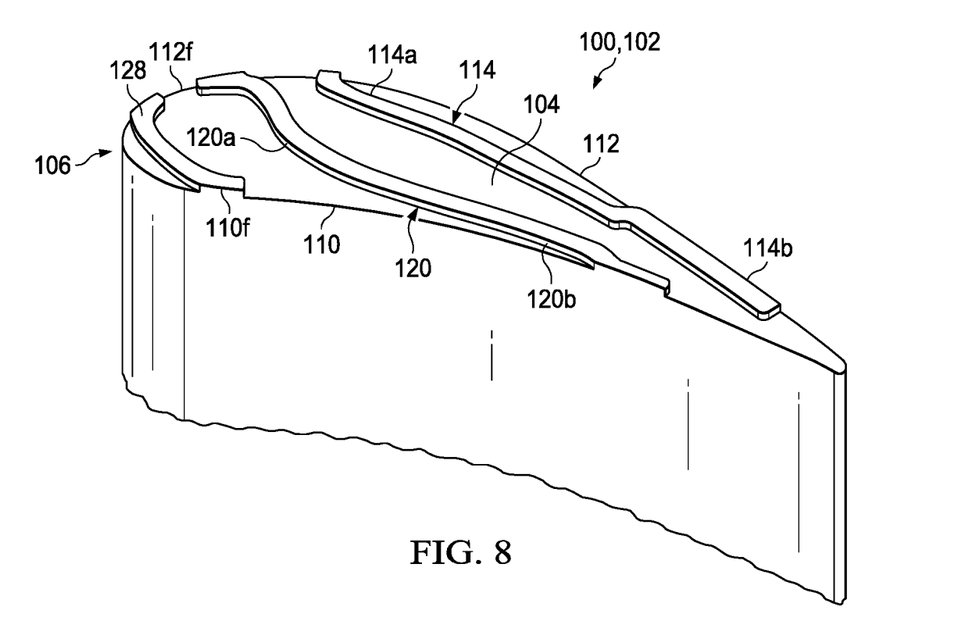
FIG. 8 is a perspective view of an exemplary tip structure for a turbine blade, according to another embodiment.
Figure 9:
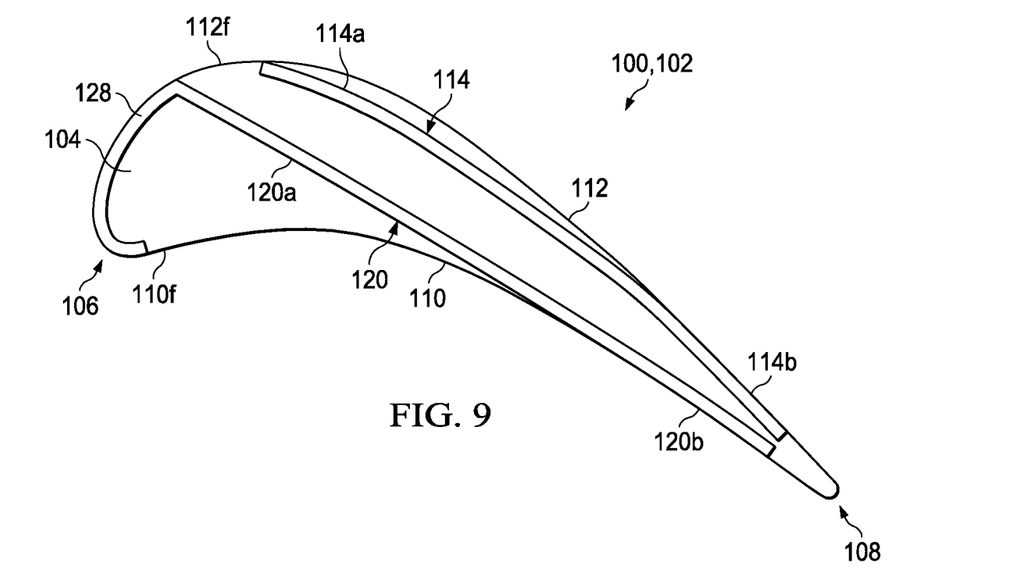
FIG. 9 is a top view of an exemplary tip structure for a turbine blade, according to another embodiment.
Figure 10:
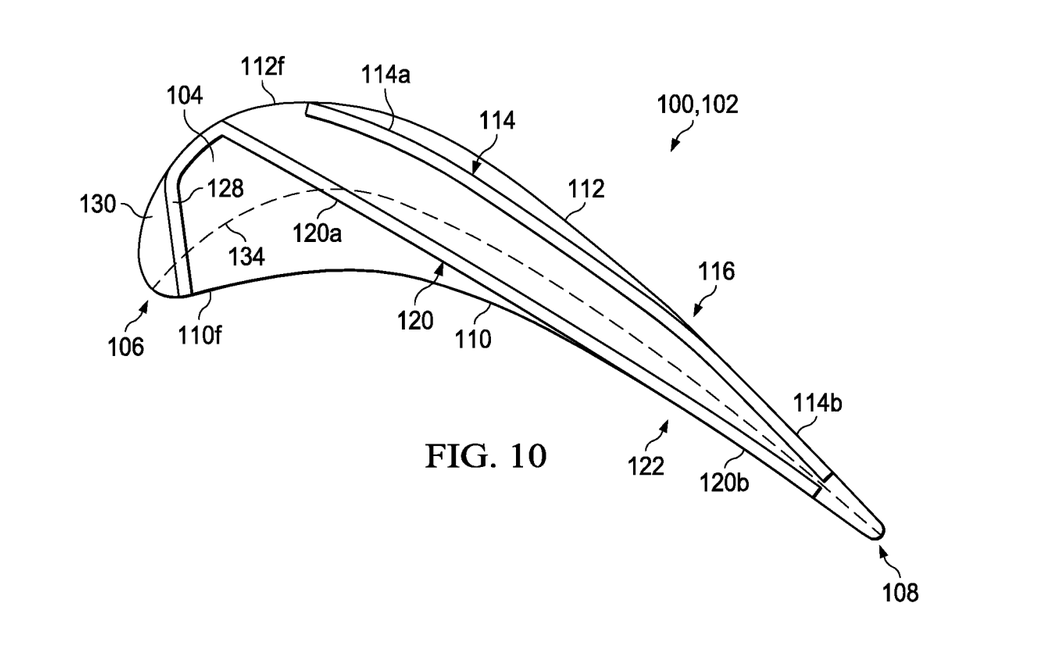
FIG. 10 is a top view of an exemplary tip structure for a turbine blade, according to another embodiment.

Referring now to FIGS. 8-10, the tip structure 102 may also include an additional rail 128 extending on the tip surface 104 from a location near the leading edge 106 on the forward suction side 112f of the airfoil 100 to a location near the leading edge 106 on the forward pressure side 110f of the airfoil 100. In some embodiments, as shown in FIG. 8, the additional rail 128 does not contact either the pressure side rail 120 or the suction side rail 114. Alternatively, the additional rail 128 may contact the pressure side rail 120 along some part of the leading segment 120a. For example, as shown in FIGS. 9 and 10, the additional rail 128 may originate from the termination end of the leading segment 120a on the forward suction side 112f of the airfoil 100 and extend to the forward pressure side 110f of the airfoil 100, as shown in FIGS. 8-9. The additional rail 128 may extend flush with the forward suction side 112f of the airfoil 100 around the leading edge 106, as shown in FIG. 9. Alternatively, all or a portion of the additional rail 128 may be recessed from the leading edge 106 on the tip surface 104 so as to create a shelf 130 between the additional rail 128 and the leading edge 106 of the airfoil 100, as shown in FIG. 10. The presence of the additional rail 128 in combination with the leading segment 120a of the pressure side rail 120, which crosses over the camber line 134, may promote formation of a cooling pocket on the tip surface 104 that limits heat transfer on the tip 102. In some embodiments, the additional rail 128 may form a closed loop, such as an isolated closed loop that does not involve contact with the pressure side rail 120 or a segmented closed loop formed by contacting the pressure side rail 120 with the additional rail 128.

Figure 11:
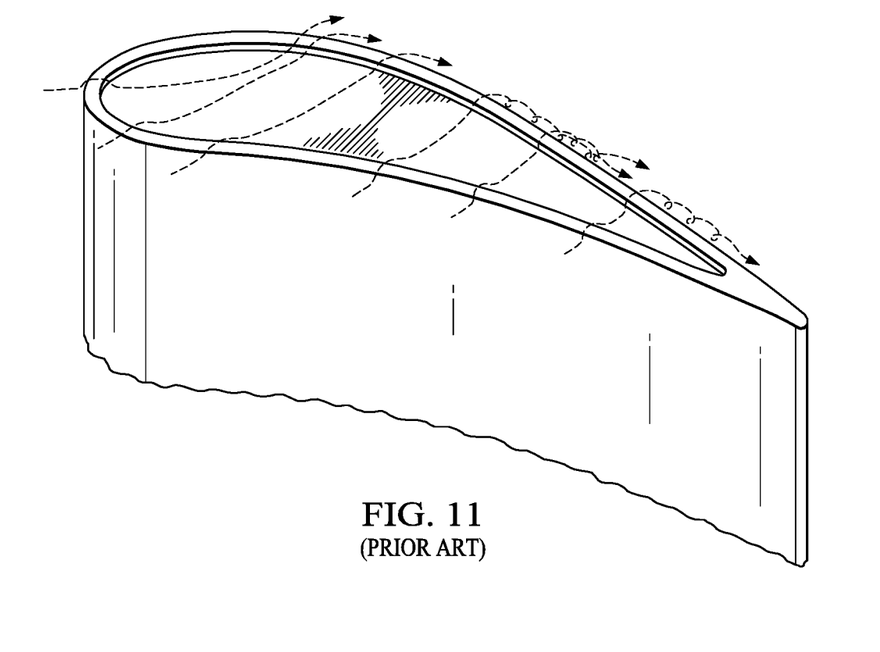
FIG. 11 is a perspective view of a prior art tip structure for a turbine blade, where flow arrows indicate possible pathways of over-tip flow.

Various embodiments of the tip structure 102, including those described in this disclosure and shown in the figures, have been evaluated using computational fluid dynamics (CFD) simulations. To carry out the CFD simulations, a computational domain is specified based on the tip structure, a grid is generated, and various inputs are provided (boundary conditions, fluid properties, etc.) to model the flow field as it passes over the tip. The results of the CFD simulations are compared to results obtained from CFD simulations of a previously developed tip, which is sometimes called a squealer tip and will be referred to as a "standard tip" in the description that follows. The standard tip includes pressure and suction side rails that follow the perimeter of the tip surface along the pressure and suction sides of the airfoil and meet at both the leading edge and trailing edge of the airfoil, as shown in FIG. 11. Dozens of different tip structures that include various configurations of pressure and suction side rails, as well as (in some cases) joiner rails and/or additional rails as described above, have been analyzed with the CFD simulations.

Figure 12A:
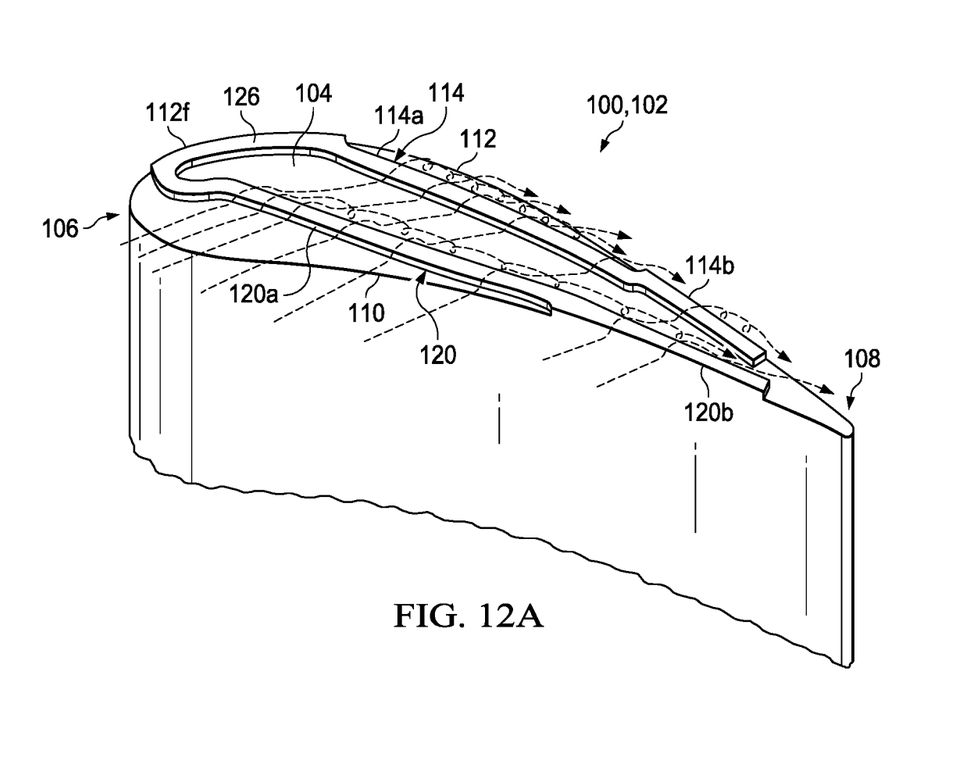
FIGS. 12A and 12B are perspective views (from the pressure side and the suction side, respectively) of an exemplary tip structure for a turbine blade that may achieve a high aerodynamic efficiency, where flow arrows in FIG. 12A indicate possible pathways of over-tip flow.
Figure 12B:
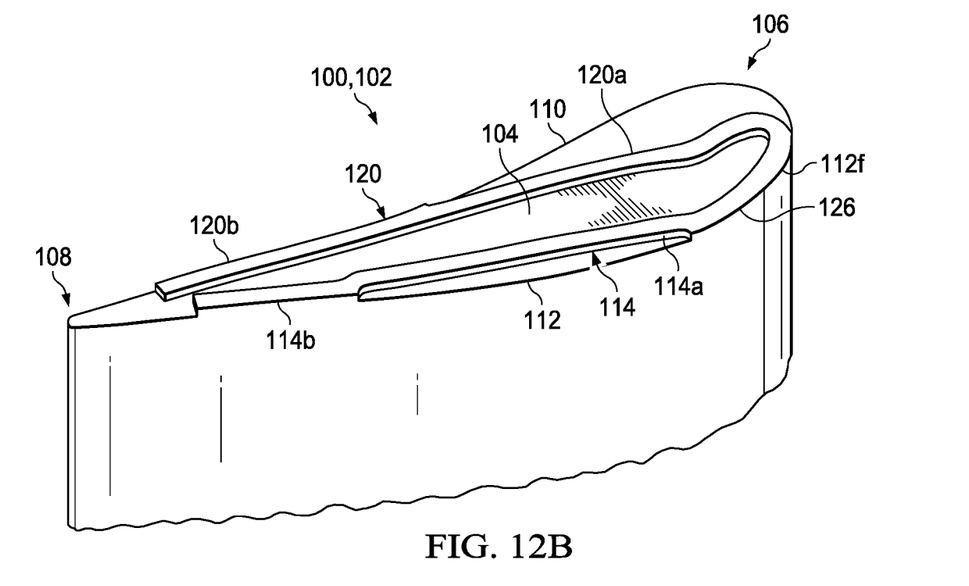
Figure 13:
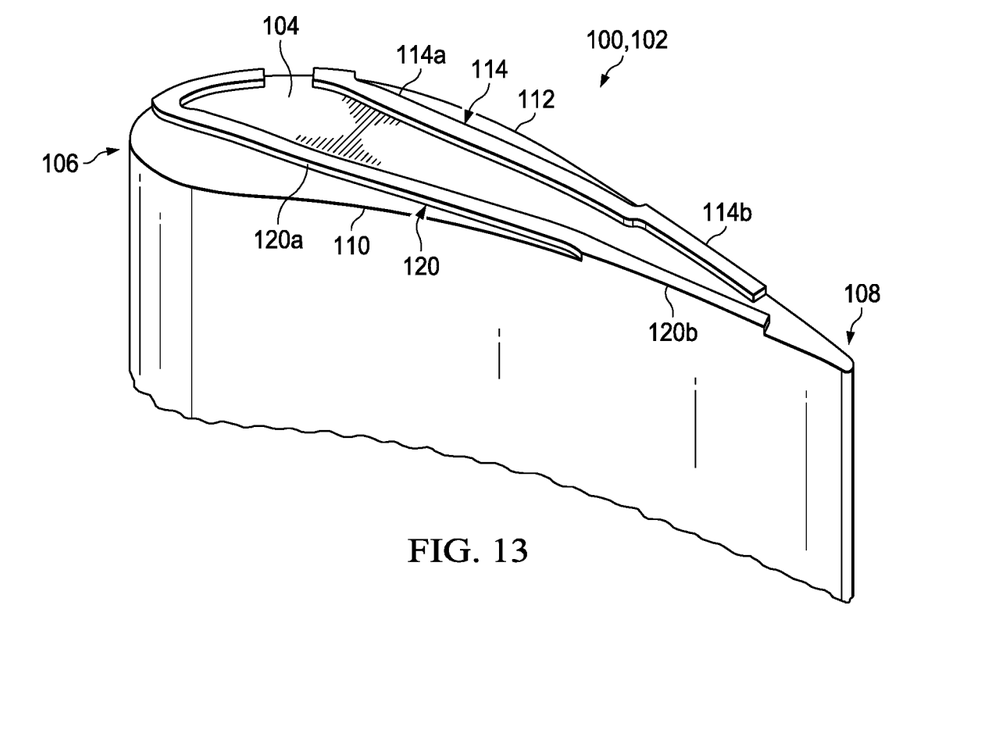
FIG. 13 is a perspective view of an exemplary tip structure for a turbine blade, according to another embodiment.

When compared with the CFD results from the standard tip, the new tip structures exhibit improvements in relative aerodynamic stage efficiency of as much as 0.53% and reductions in airfoil tip heat transfer of as much as −65%. For example, the tip structure 102 shown in FIGS. 12A and 12B exhibits the highest relative aerodynamic efficiency (0.53%) of the simulated tip structures and has a tip heat transfer comparable to the standard tip (and thus a 0% relative heat transfer). This tip structure 102 includes a pressure side rail 120 comprising two abrupt or gentle curves within the leading segment 120a, which terminates at the forward suction side 112f of the airfoil 100 and is joined to the suction side rail 114 by a joining rail 126. The suction side rail 114 also includes two abrupt or gentle curves within the leading portion 114a. By making small modifications to the tip structure of FIGS. 12A and 12B, as shown in FIG. 13, it is possible to obtain a reduction in relative tip heat transfer (−12%) with only a small sacrifice in relative aerodynamic efficiency (0.42%).

Figure 14A:
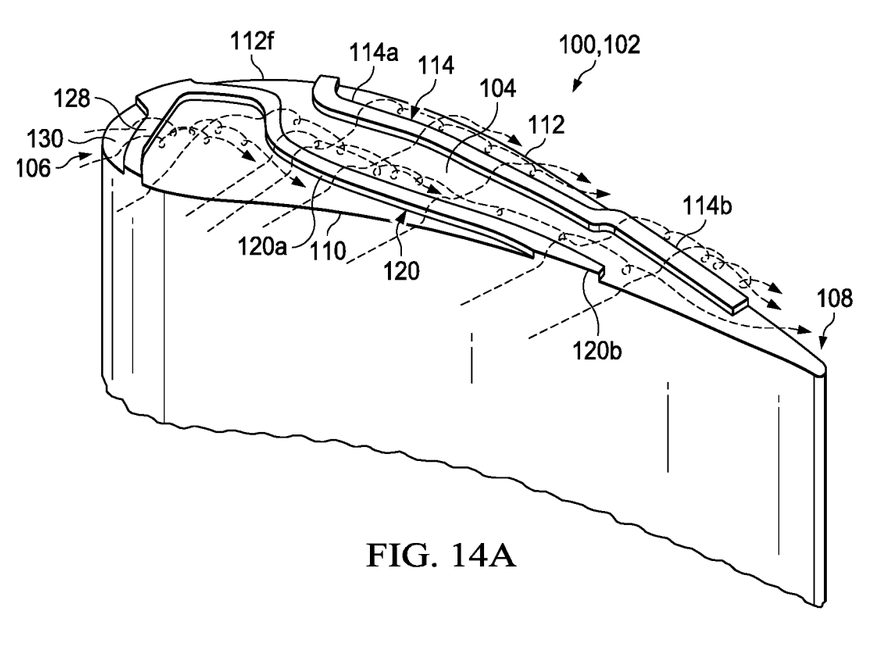
FIGS. 14A and 14B are perspective views (from the pressure side and suction side, respectively) of an exemplary tip structure for a turbine blade that may exhibit low heat transfer, where flow arrows in FIG. 14A indicate possible pathways of over-tip flow.
Figure 14B:
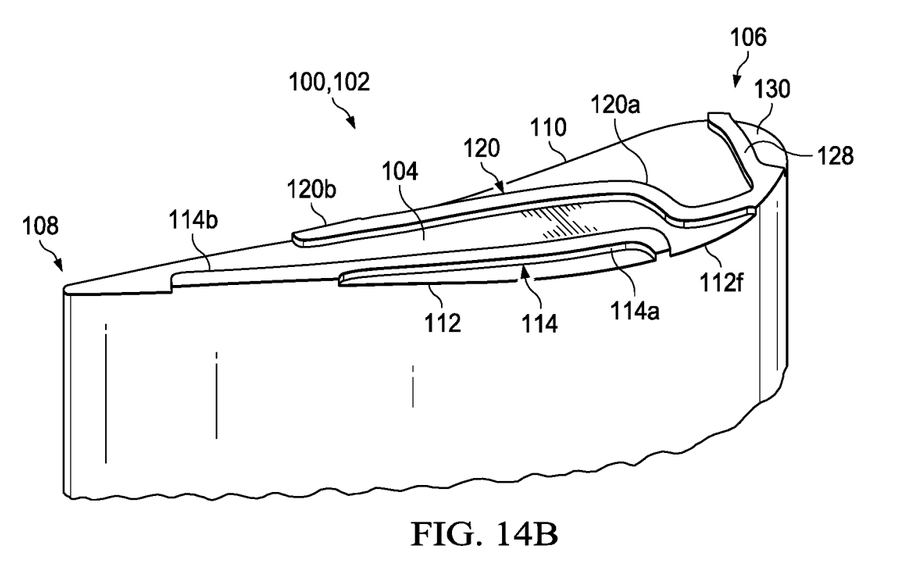

The tip structure shown in FIGS. 14A and 14B exhibits the lowest relative tip heat transfer (−65%) of the designs explored in the simulations, combined with a relative aerodynamic efficiency of about 0.26%. This tip structure 102 includes a pressure side rail 120 comprising consecutive gentle and abrupt curves in the leading segment 120a before terminating on the forward suction side 112f of the airfoil 100. An additional rail 128 connected to the termination end of the leading segment 120a crosses the tip surface 104 recessed from the suction side 112 of the airfoil 100, thereby forming a shelf 130 between the leading edge 106 and the additional rail 128. The simulations reveal that small modifications to this tip structure 102 may lead to an increase in relative aerodynamic efficiency to about 0.33% with only a small increase in relative tip heat transfer (about −26%).

The pressure and suction side rails 120,114, as well as the optional joining rail 126 and the optional additional rail 128, referred to collectively as "the rails," may have any of a wide range of widths (or thicknesses) and heights above the tip surface 104 in any of the embodiments described herein. Typically, each of the rails is from about 0.02 inch to about 0.05 inch in width and from about 0.015 inch to about 0.05 inch in height. The height and/or thickness of the rails need not be constant along the length. A transverse cross-sectional view of any of the rails may reveal a square or rectangular cross-section, typically with a fillet (rounded junction) at the base of each rail.

Figures 15A, 15B, 15C:
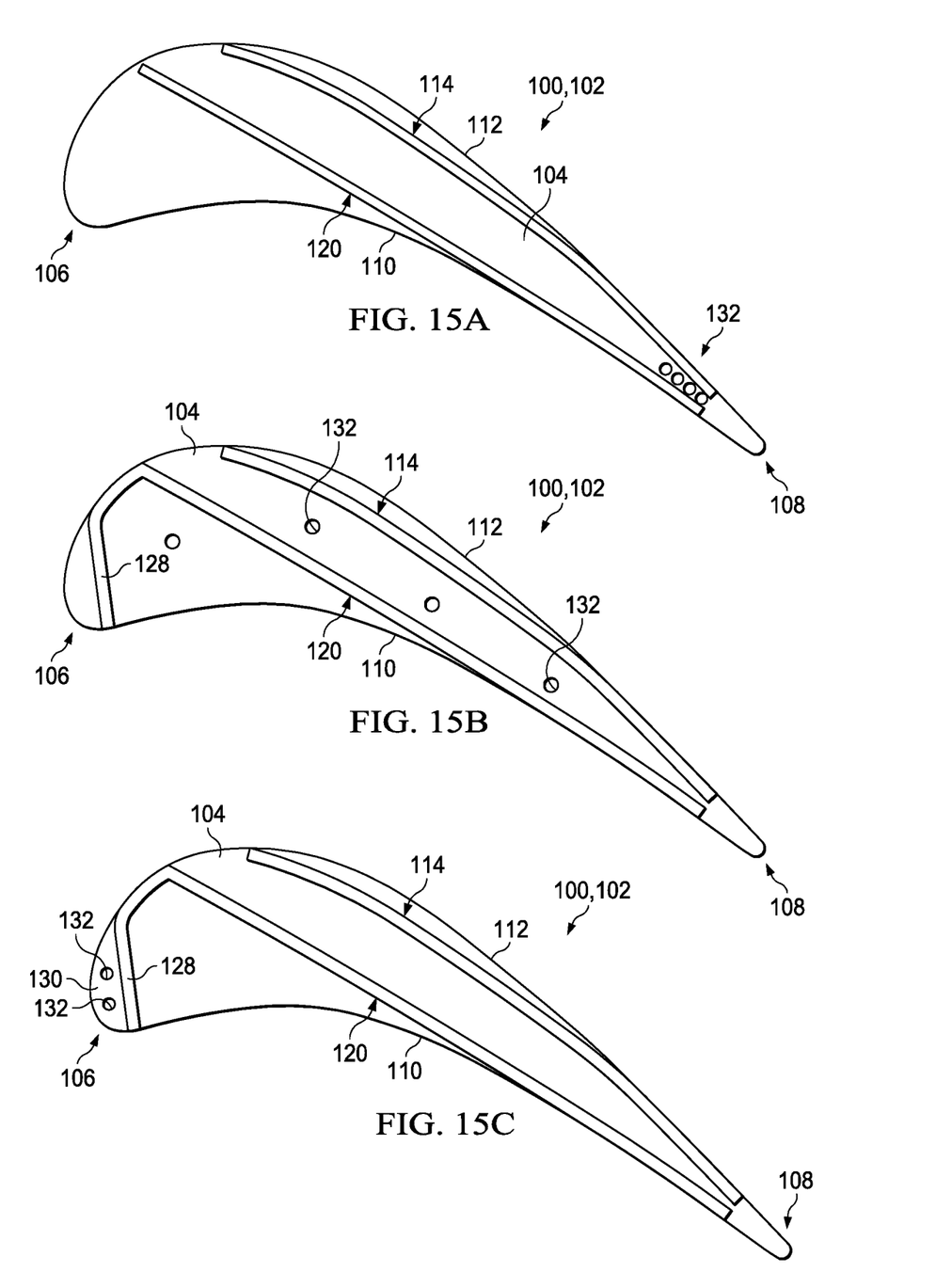
FIGS. 15A-15C show top views of exemplary tip structures that include different configurations of cooling holes penetrating the tip surface.

To promote tip cooling, the tip structures 102 described in this disclosure may include cooling holes 132 that extend through the tip surface 104 so as to be in fluid communication with a coolant cavity used to circulate cooling fluid within the body (or spar) of the airfoil 100 and onto the tip surface 104. Generally speaking, the cooling holes 132 may have any configuration on the tip surface 104 as long as they are distributed adjacent to or between the rails. FIGS. 15A-15C show exemplary configurations of cooling holes 132, including: a linear array of cooling holes 132 between the pressure and side rails 120,114 near the trailing edge 108 (FIG. 15A); an array of cooling holes 132 distributed over the entire tip surface 104 between the rails 114,120,128 (FIG. 15C); and one or more cooling holes 132 arranged on the shelf 130 formed between the additional rail 128 and the leading edge 106. In another example, the cooling holes 132 could be distributed on the tip surface 104 in an arrangement that combines two or more of the configurations of FIGS. 15A-15C.

The airfoils described herein according to various embodiments may be fabricated using investment casting methods known in the art. The various rails on the tip surface (e.g., pressure and suction side rails, optional joining rail and optional additional rail) may be integrally formed with the tip structure during the casting process. Also or alternatively, the rails could be formed or modified in size or shape by machining after casting. The airfoil may be formed from one or more materials that have high melting points, good oxidation/corrosion resistance and high-temperature strength. For example, a nickel-base superalloy may be suitable. The superalloy may have an equiaxed, directionally solidified, or single-crystal microstructure.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

Furthermore, the advantages described above are not necessarily the only advantages, and it is not necessarily expected that all of the described advantages will be achieved with every embodiment.

What is claimed is:

1. A tip structure for a turbine blade, the tip structure comprising:
   a tip surface of an airfoil, the tip surface extending from a leading edge to a trailing edge and from a pressure side to a suction side of the airfoil;
   a suction side rail protruding from the tip surface and comprising:
      a trailing portion extending flush with the suction side of the airfoil from an origination location at or near the trailing edge to an intermediate location on the suction side; and
      a leading portion extending from the intermediate location across the tip surface so as to create a suction side shelf region between the leading portion of the suction side rail and the suction side of the airfoil; and
   a pressure side rail protruding from the tip surface and comprising:
      a trailing segment extending flush with the pressure side of the airfoil from an origination location at or near the trailing edge to a middle location on the pressure side; and
      a leading segment extending from the middle location across a camber line on the tip surface so as to create a pressure side shelf region between the leading segment of the pressure side rail and the pressure side of the airfoil.

2. The tip structure of claim 1, wherein, at or near the trailing edge of the airfoil, the pressure side rail is joined to the suction side rail.

3. The tip structure of claim 1, wherein, at or near the trailing edge of the airfoil, the pressure side rail is spaced apart from the suction side rail on the tip surface to allow fluid flow to exit.

4. The tip structure of claim 3, wherein the origination location of the trailing segment of the pressure side rail is at the trailing edge, and
   wherein the origination location of the trailing portion of the suction side rail is short of the trailing edge.

5. The tip structure of claim 3, wherein the origination location of the trailing portion of the suction side rail is at the trailing edge, and
   wherein the origination location of the trailing segment of the pressure side rail is short of the trailing edge.

6. The tip structure of claim 3, wherein the origination location of the trailing portion of the suction side rail and the origination location of the trailing segment of the pressure side rail are both short of the trailing edge.

7. The tip structure of claim 1, wherein the leading portion of the suction side rail and the leading segment of the pressure side rail are joined by a joining rail on the tip surface.

8. The tip structure of claim 7, wherein the joining rail extends flush with a forward suction side of the airfoil.

9. The tip structure of claim 7, wherein the joining rail is recessed from a forward suction side of the airfoil.

10. The tip structure of claim 1, wherein the leading portion of the suction side rail is substantially straight or gently curved.

11. The tip structure of claim 1, wherein the leading portion of the suction side rail includes at least one abrupt curve.

12. The tip structure of claim 1, wherein the leading segment of the pressure side rail is substantially straight or gently curved.

13. The tip structure of claim 1, wherein the leading segment of the pressure side rail includes at least one abrupt curve.

14. The tip structure of claim 1, wherein the leading segment of the pressure side rail terminates short of the suction side of the airfoil.

15. The tip structure of claim 1, wherein the leading segment of the pressure side rail extends to a location flush with the suction side of the airfoil.

16. The tip structure of claim 1, further comprising an additional segment extending on the tip surface from a location near the leading edge on a forward suction side of the airfoil to a location near the leading edge on a forward pressure side of the airfoil.

17. The tip structure of claim 16, wherein the additional segment contacts the pressure side rail along some portion of the leading segment.

18. The tip structure of claim 17, wherein the additional segment contacts the pressure side rail at a termination end of the leading segment.

19. The tip structure of claim 16, wherein the additional segment extends flush with the forward suction side of the airfoil around the leading edge.

20. The tip structure of claim 16, wherein at least a portion of the additional segment is recessed from the leading edge so as to create a shelf between the additional segment and the leading edge of the airfoil.

21. The tip structure of claim 1, further comprising a plurality of cooling holes in the tip surface.

* * * * *